United States Patent
Beck et al.

(10) Patent No.: US 10,037,194 B2
(45) Date of Patent: Jul. 31, 2018

(54) SYSTEMS AND METHODS FOR VISUAL DATA MANAGEMENT

(71) Applicant: American Express Travel Related Services Co., Inc., New York, NY (US)

(72) Inventors: Eric C. Beck, Scottsdale, AZ (US); Anadi Bhalla, Haryana (IN); Abdul A. Habib, Phoenix, AZ (US); Preeti Jain, New Delhi (IN); Michael B. Macal, Gilbert, AZ (US); Harish R. Naik, Phoenix, AZ (US); Satish T. Narayanan, Phoenix, AZ (US); Brian C. Rosenfield, Mukilteo, WA (US)

(73) Assignee: AMERICAN EXPRESS TRAVEL RELATED SERVICES COMPANY, INC., New York, NY (US)

( * ) Notice: Subject to any disclaimer, the term of this patent is extended or adjusted under 35 U.S.C. 154(b) by 98 days.

(21) Appl. No.: 15/004,493

(22) Filed: Jan. 22, 2016

(65) Prior Publication Data
US 2017/0212731 A1    Jul. 27, 2017

(51) Int. Cl.
| | |
|---|---|
| G06F 9/44 | (2018.01) |
| G06F 8/34 | (2018.01) |
| G06F 3/0484 | (2013.01) |
| G06F 3/0482 | (2013.01) |
| G06F 8/30 | (2018.01) |
| G06F 9/445 | (2018.01) |
| G06F 9/448 | (2018.01) |

(Continued)

(52) U.S. Cl.
CPC ............ *G06F 8/34* (2013.01); *G06F 3/0482* (2013.01); *G06F 3/04842* (2013.01); *G06F 8/30* (2013.01); *G06F 9/4494* (2018.02); *G06F 9/44536* (2013.01); *G06F 8/20* (2013.01); *G06F 8/38* (2013.01)

(58) Field of Classification Search
CPC ............ G06F 3/048–3/04897; G06F 17/301–17/30197; G06F 17/30501–17/30598; G06F 8/20–8/78
See application file for complete search history.

(56) References Cited

U.S. PATENT DOCUMENTS

| | | | |
|---|---|---|---|
| 5,623,657 A * | 4/1997 | Conner .................. | G06F 8/24 719/315 |
| 6,253,368 B1 * | 6/2001 | Nelin .................. | G06F 9/45512 717/124 |

(Continued)

OTHER PUBLICATIONS

Keim, Daniel A., "Challenges in Visual Data Analysis", pp. 1-6. (Year: 2006).*

(Continued)

*Primary Examiner* — Thuy Dao
*Assistant Examiner* — Christopher J Franco
(74) *Attorney, Agent, or Firm* — Snell & Wilmer, L.L.P.

(57) ABSTRACT

An authoring tool may comprise a plurality of predefined functions displayed in a visual manner. A user may select functions from the predefined functions to create a logic map. The authoring tool may read metadata from a metadata store corresponding to the functions. The authoring tool may generate an intermediate language, and compile the metadata from the intermediate language to a desired language. The authoring tool may execute the logic map on data in a data management system.

20 Claims, 5 Drawing Sheets

(51) Int. Cl.
  *G06F 8/20* (2018.01)
  *G06F 8/38* (2018.01)

(56) References Cited

U.S. PATENT DOCUMENTS

| | | | | |
|---|---|---|---|---|
| 7,110,936 B2* | 9/2006 | Hiew | ................. | G06F 8/34 |
| | | | | 703/22 |
| 7,426,734 B2* | 9/2008 | Debique | ................. | G06F 8/20 |
| | | | | 718/104 |
| 9,213,531 B2* | 12/2015 | Tallam | ................. | G06F 8/4434 |
| 2005/0091672 A1* | 4/2005 | Debique | ................. | G06F 8/20 |
| | | | | 719/328 |
| 2005/0229154 A1* | 10/2005 | Hiew | ................. | G06F 8/34 |
| | | | | 717/110 |
| 2006/0111888 A1* | 5/2006 | Hiew | ................. | G06F 8/34 |
| | | | | 703/22 |
| 2010/0229161 A1* | 9/2010 | Mori | ................. | G06F 8/456 |
| | | | | 717/149 |
| 2015/0317139 A1* | 11/2015 | Tallam | ................. | G06F 8/4434 |
| | | | | 717/151 |

OTHER PUBLICATIONS

Callahan, Steven P., "VisTrails: Visualization meets Data Management", pp. 745-747. (Year: 2006).*
Chang, Chia Hui et al., "OLERA—Semisupervised Web-Data Extraction with Visual Support", pp. 56-64. (Year: 2004).*
Eick, Stephen G., "Visual Discovery and Analysis", pp. 44-58. (Year: 2000).*
Kit, Chantola, et al., "Algorithms for Efficient Structure-based Grouping in XML-OLAP", pp. 170-177. (Year: 2008).*
Afif, Shereen M. et al., "Accelerated Access to Visual Data in Multimedia Applications", pp. 172-177. (Year: 2010).*

* cited by examiner

SYSTEMS AND METHODS FOR VISUAL DATA MANAGEMENT

FIELD

This disclosure relates to data management, and more particularly, to performing functions on large data sets.

BACKGROUND

Large data sets may comprise hundreds of variables and thousands of data tables. As such, it may be time consuming to generate code which extracts the desired data in a usable manner. Moreover, individuals who may use the data to make business decisions may lack the technical capabilities to create the code. Therefore, programmers are often enlisted to create the code, which adds time and cost to making business decisions. Additionally, the data may be stored in a variety of formats, and the code which is written for one format may need to be rewritten in order to execute on other formats. Moreover, multiple users may write variations of similar code to perform similar functions, which may result in different values for similar variables.

SUMMARY

Systems and methods may comprise creating a logic map comprising a function; selecting a language in which to execute the logic map; reading metadata in a metadata store corresponding to the function; generating an intermediate language; compiling the metadata from the intermediate language to code in the selected language; and executing the code in a data management system.

In various embodiments, the selected language comprises Teradata, Sybase, Hive, or COBOL. The function may be selected from a plurality of predefined functions. The logic map may comprise a visual representation of a plurality of functions. The code may be executed on a plurality of rollup variables, and the plurality of rollup variables may be stored in a common data table. The data management system may comprise a distributed file system.

BRIEF DESCRIPTION OF THE DRAWINGS

The subject matter of the present disclosure is particularly pointed out and distinctly claimed in the concluding portion of the specification. A more complete understanding of the present disclosure, however, may best be obtained by referring to the detailed description and claims when considered in connection with the drawing figures, wherein like numerals denote like elements.

DETAILED DESCRIPTION

The detailed description of various embodiments herein makes reference to the accompanying drawings and pictures, which show various embodiments by way of illustration. While these various embodiments are described in sufficient detail to enable those skilled in the art to practice the disclosure, it should be understood that other embodiments may be realized and that logical and mechanical changes may be made without departing from the spirit and scope of the disclosure. Thus, the detailed description herein is presented for purposes of illustration only and not of limitation. For example, the steps recited in any of the method or process descriptions may be executed in any order and are not limited to the order presented. Moreover, any of the functions or steps may be outsourced to or performed by one or more third parties. Furthermore, any reference to singular includes plural embodiments, and any reference to more than one component may include a singular embodiment.

Systems and methods for data management are disclosed. Data operations may be visually represented to allow persons with limited programming knowledge to apply complex rules to data sets. The system may use an authoring tool with integrated workflows. The authoring tool may allow users to visually construct multi-step processes based in SQL. The authoring tool may generate code in multiple languages, such that the authoring tool is cross-platform compatible.

Figure 1:
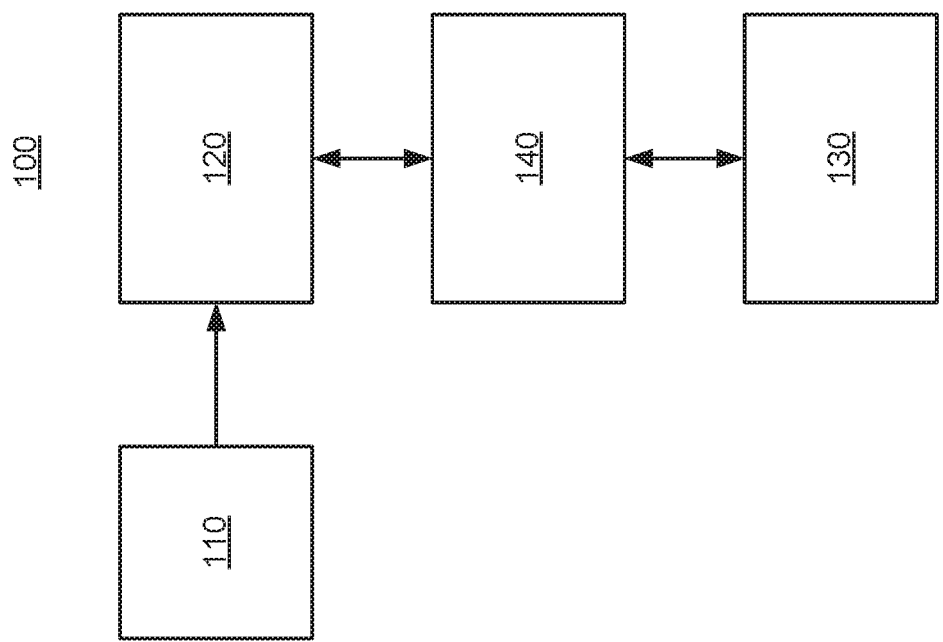
FIG. 1 illustrates a system for data management, in accordance with various embodiments.

Referring to FIG. 1, a system 100 for data management is illustrated, according to various embodiments. The system may comprise a data source 110, a data management system 120, a authoring tool 130, and a scheduling engine 140. The data source 110 may provide data to the data management system 120. The data source 110 may comprise a plurality of data sources. For example, a card authorization system may acquire transaction data for financial transactions performed by consumers. Each time a consumer uses a transaction account, the data for the transaction (e.g., time, location, merchant, and amount) may be transmitted to data management system 120. A credit bureau may provide credit history information to data management system 120. A web server may collect information on a consumer's internet browsing history (e.g., a clickstream and amount of time spent on each webpage) and provide this data to the data management system 120. The data source 110 may provide data to the data management system 120 in real time as the data source 110 obtains new data. The data management system 120 may store metadata describing the data received from the data source 110.

The data management system 120 may comprise a software framework for distributed processing of very large data sets on computer clusters, such as Apache Hadoop®. The data management system 120 may comprise a distributed file system, as further described with reference to FIG. 2 and FIG. 3. The data management system 120 may prepare and aggregate the data received from the data source 110. The data management system 120 may store data tables which comprise a plurality of consumer attributes. For example, the consumer attributes may comprise income, geography, average spend, total spend for a timeframe, industry, default risk value, job title, FICO score, and/or the like. In various embodiments, the data management system 120 may create a rollup variable for consumer attributes. For example, the data management system 120 may receive a transaction amount for a plurality of transactions for a consumer, and the data management system 120 may create a rollup variable comprising an average amount of each of the plurality of transactions.

The rollup variables may be stored in a common data table. The common data table may be accessed by multiple users or applications. Business logic may be applied to the rollup variables in order to identify a particular segment of consumers. By storing the rollup variables in the common data table, many logic strings may be executed against the rollup variables in the common data table without re-performing the rollup.

The authoring tool 130 may generate scripts which may be executed on data stored in the data management system 120. The authoring tool 130 may comprise a user interface which provides visual representations of functions. For example, the functions may be represented as drag and drop boxes. The authoring tool 130 may comprise a plurality of predefined functions. In various embodiments, the predefined functions may comprise windowing functions, ranking functions, math functions, average sum, logistic regression, and/or the like. The user may select one or more functions, and the authoring tool may prompt the user to enter fields upon which the function may execute. In various embodiments, the user may create a logic map comprising a plurality of functions. The logic map may be saved. The authoring tool 130 may store any changes which are made to the logic map in a log file.

The authoring tool 130 may select a language in which the functions should execute. For example, a language may be CyBase, Teradata, Hive, COBOL, and/or the like. The authoring tool 130 may comprise a metadata store. The metadata store may store metadata describing the functions. The authoring tool 130 may generate an intermediate language. The authoring tool 130 may compile metadata from the intermediate language to the selected language. The authoring tool 130 may store attributes from user input as tokens along with their relationship to each other in a metadata repository. The tokens may be assembled into a SQL based syntax tree. The syntax tree may be parsed for understanding, and then feeds the tokens and their relationships into a compiler which then renders the desired dialect output of Hive, Sybase, or Teradata, etc. The authoring tool 130 may generate code in the appropriate syntax and execute the code on the desired data in the data management system 120. The data management system 120 may output a file comprising the results of the functions and any errors.

In various embodiments, a specific product may be marketed to consumers who satisfy specified criteria. For example, a gold level transaction account may be targeted to consumers in the lowest 20% of default risk scores, and a platinum level transaction account may be targeted to consumers in the lowest 10% of default risk scores. Threshold score values may be adjusted for each product to increase or decrease the number of consumers eligible to receive offers for the product. A user may create functions in the authoring tool 130 which may identify consumer profiles in the data management system 120 which satisfy the specified criteria, and the data management system 120 may output a list of consumer profiles which satisfy the specified criteria.

The scheduling engine 140 may execute functions on the data in the data management system 120 on a periodic basis. For example, the scheduling engine 140 may instruct the data management system 120 to create rollup variables on a daily basis. Each time the scheduling engine 140 instructs the data management system 120 to create rollup variables, the data management system 120 may create rollup variables using current data. The rollup variables may be stored in the common data table. Thus, the rollup variables in the common data table may be updated regularly, and business logic may be executed on the most current rollup variables.

Figure 2:
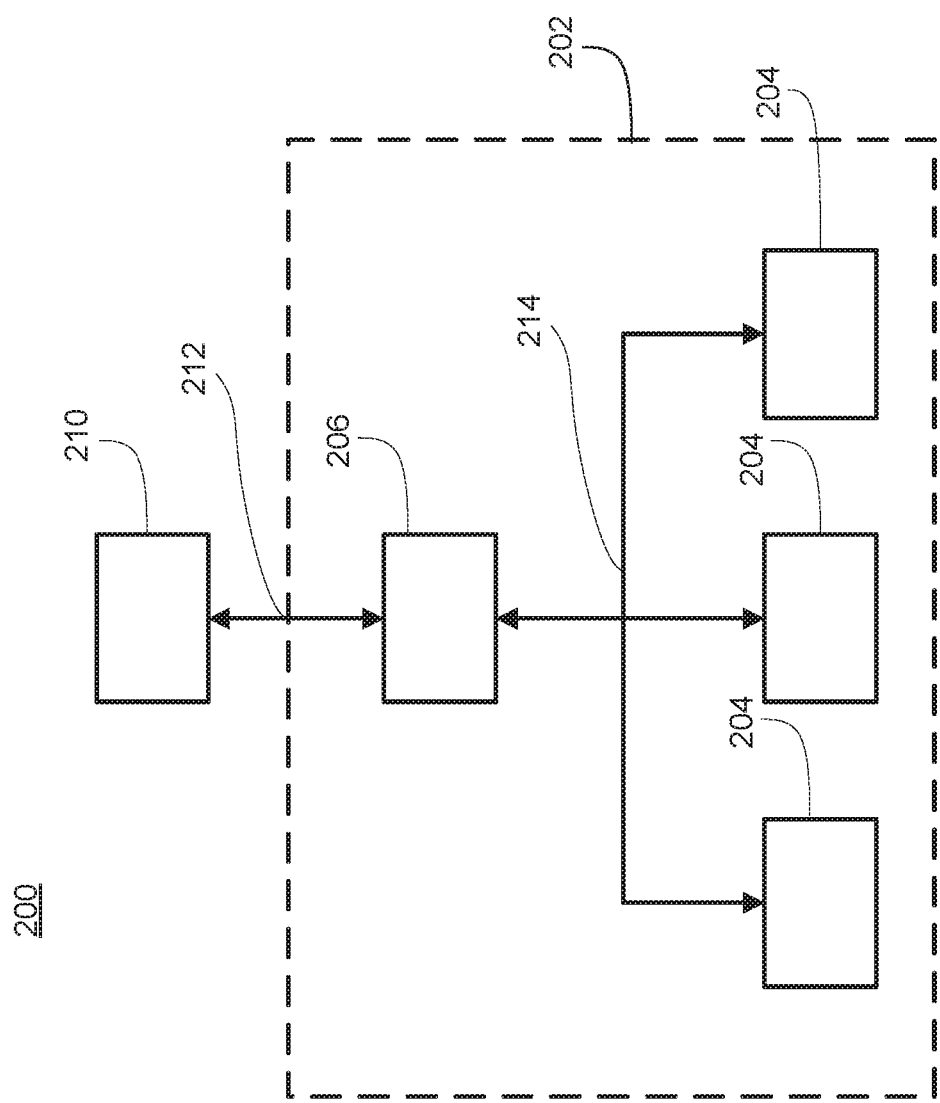
FIG. 2 illustrates a distributed file system, in accordance with various embodiments.

In various embodiments, the data management system 120 may be implemented using a distributed file system. Referring to FIG. 2, a distributed file system (DFS) 200 is shown, in accordance with various embodiments. DFS 200 comprises a distributed computing cluster 202 configured for parallel processing and storage. Distributed computing cluster 202 may comprise a plurality of nodes 204 in electronic communication with each of the other nodes, as well as a control node 206. Processing tasks may be split among the nodes of distributed computing cluster 202 to improve throughput and enhance storage capacity. Distributed computing cluster may be, for example, a Hadoop® cluster configured to process and store big data sets with some of nodes 204 comprising a distributed storage system and some of nodes 204 comprising a distributed processing system. In that regard, distributed computing cluster 202 may be configured to support a Hadoop® distributed file system (HDFS) as specified by the Apache Software Foundation at http://hadoop.apache.org/docs/.

In various embodiments, nodes 204, control node 206, and client 210 may comprise any devices capable of receiving and/or processing an electronic message via network 212 and/or network 214. For example, nodes 204 may take the form of a computer or processor, or a set of computers/processors, such as a system of rack-mounted servers. However, other types of computing units or systems may be used, including laptops, notebooks, hand held computers, personal digital assistants, cellular phones, smart phones (e.g., iPhone®, BlackBerry®, Android®, and/or the like.) tablets, wearables (e.g., smart watches and smart glasses), or any other device capable of receiving data over the network.

In various embodiments, client 210 may submit requests to control node 206. Control node 206 may distribute the tasks among nodes 204 for processing to complete the job intelligently. Control node 206 may thus limit network traffic and enhance the speed at which incoming data is processed. In that regard, client 210 may be a separate machine from distributed computing cluster 202 in electronic communication with distributed computing cluster 202 via network 212. A network may be any suitable electronic link capable of carrying communication between two or more computing devices. For example, network 212 may be local area network using TCP/IP communication or wide area network using communication over the Internet. Nodes 204 and control node 206 may similarly be in communication with one another over network 214. Network 214 may be an internal network isolated from the Internet and client 210, or, network 214 may comprise an external connection to enable direct electronic communication with client 210 and the internet.

A network may be unsecure. Thus, communication over the network may utilize data encryption. Encryption may be performed by way of any of the techniques now available in the art or which may become available—e.g., Twofish, RSA, El Gamal, Schorr signature, DSA, PGP, PKI, GPG (GnuPG), and symmetric and asymmetric cryptography systems.

In various embodiments, DFS 200 may process hundreds of thousands of records from a single data source. DFS 200 may also ingest data from hundreds of data sources. The data may be processed through data transformations to generate output variables from input variables. In that regard, input variables may be mapped to output variables by applying data transformations to the input variables and intermediate variables generated from the input values. Nodes 204 may process the data in parallel to expedite the processing. Furthermore, the transformation and intake of data as disclosed below may be carried out in memory on nodes 204. For example, in response to receiving a source data file of 100,000 records, a system with 200 nodes 204 may distribute the task of processing 1,000 records to each node 204 for batch processing. Each node 204 may then process the stream of 1,000 records while maintaining the resultant data in memory until the batch is complete for batch processing jobs. The results may be written, augmented, logged, and written to disk for subsequent retrieval. The results may be written to disks using various big data storage formats.

Figure 3:
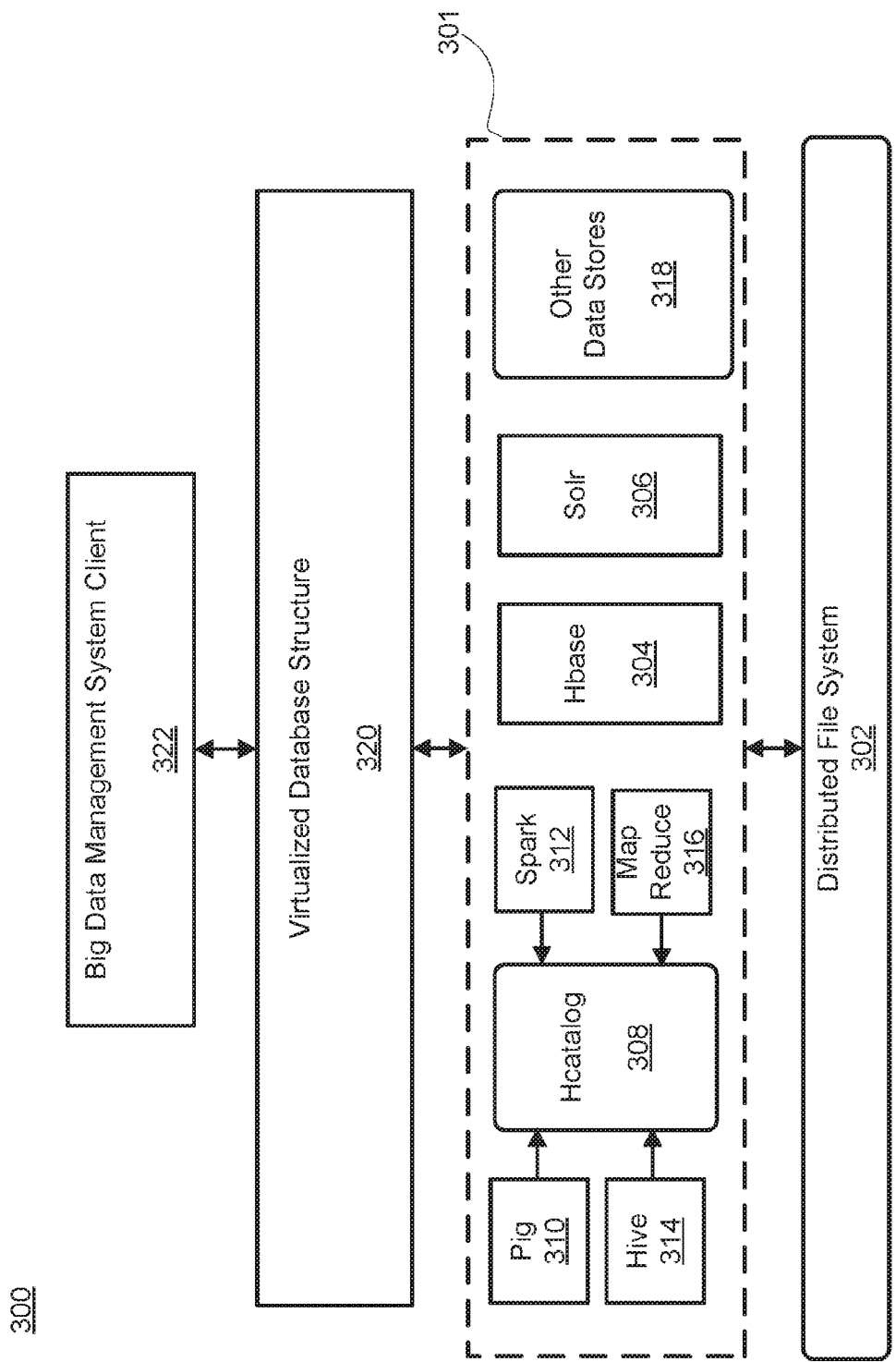
FIG. 3 illustrates a big data management system, in accordance with various embodiments.

With reference to FIG. 3, an exemplary architecture of a big data management system (BDMS) 300 is shown, in accordance with various embodiments. BDMS 300 may be similar to or identical to DFS 200 of FIG. 2, for example. DFS 302 may serve as the physical storage medium for the various data storage formats 301 of DFS 302. A non-relational database 304 may be maintained on DFS 302. For example, non-relational database 304 may comprise an HBase™ storage format that provides random, real time read and/or write access to data, as described and made available by the Apache Software Foundation at http://hbase.apache.org/.

In various embodiments, a search platform 306 may be maintained on DFS 302. Search platform 306 may provide distributed indexing and load balancing to support fast and reliable search results. For example, search platform 306 may comprise a Solr® search platform as described and made available by the Apache Software Foundation at http://lucene.apache.org/solrd.

In various embodiments, a data warehouse 314 such as Hive® may be maintained on DFS 302. The data warehouse 314 may support data summarization, query, and analysis of warehoused data. For example, data warehouse 314 may be a Hive® data warehouse built on Hadoop® infrastructure. A data analysis framework 310 may also be built on DFS 302 to provide data analysis tools on the distributed system. Data analysis framework 310 may include an analysis runtime environment and an interface syntax such similar to those offered in the Pig platform as described and made available by the Apache Software Foundation at https://pig.apache.org/.

In various embodiments, a cluster computing engine 312 for high-speed, large-scale data processing may also be built on DFS 302. For example, cluster computing engine 312 may comprise an Apache Spark™ computing framework running on DFS 302. DFS 302 may further support a MapReduce layer 316 for processing big data sets in a parallel, distributed manner to produce records for data storage formats 301. For example, MapReduce layer 316 may be a Hadoop® MapReduce framework distributed with the Hadoop® HDFS as specified by the Apache Software Foundation at http://hadoop.apache.org/docs/. The cluster computing engine 312 and MapReduce layer 316 may ingest data for processing, transformation, and storage in data storage formats 301 using the distributed processing and storage capabilities of DFS 302.

In various embodiments, DFS 302 may also support a table and storage management layer 308 such as, for example, an HCatalog installation. Table and storage management layer 308 may provide an interface for reading and writing data for multiple related storage formats. Continuing with the above example, an HCatalog installation may provide an interface for one or more of the interrelated technologies described above such as, for example, Hive®, Pig, Spark®, and Hadoop® MapReduce.

In various embodiments, DFS 302 may also include various other data storage formats 318. Other data storage formats 318 may have various interface languages with varying syntax to read and/or write data. In fact, each of the above disclosed storage formats may vary in query syntax and interface techniques. Virtualized database structure 320 may provide a uniform, integrated user experience by offering users a single interface point for the various different data storage formats 301 maintained on DFS 302. Virtualized database structure 320 may be a software and/or hardware layer that makes the underlying data storage formats 301 transparent to client 322 by providing variables on request. Client 322 may request and access data by requesting variables from virtualized database structure 320. Virtualized database structure 320 may then access the variables using the various interfaces of the various data storage formats 301 and return the variables to client 322.

In various embodiments, the data stored using various of the above disclosed data storage formats 301 may be stored across data storage formats 301 and accessed at a single point through virtualized database structure 320. The variables accessible through virtualized database structure 320 may be similar to a column in a table of a traditional RDBMS. That is, the variables identify data fields available in the various data storage formats 301.

In various embodiments, variables may be stored in a single one of the data storage formats 301 or replicated across numerous data storage formats 301 to support different access characteristics. Virtualized database structure 320 may comprise a catalog of the various variables available in the various data storage formats 301. The cataloged variables enable BDMS 300 to identify and locate variables stored across different data storage formats 301 on DFS 302. Variables may be stored in at least one storage format on DFS 302 and may be replicated to multiple storage formats on DFS 302. The catalog of virtualized database structure 320 may thus track the location of a variable available in multiple storage formats.

The variables may be cataloged as they are ingested and stored using data storage formats 301. The catalog may track the location of variables by identifying the storage format, the table, and/or the variable name for each variable available through virtualized database structure 320. The catalog may also include metadata describing what the variables are and where the variables came from such as data type, original source variables, timestamp, access restrictions, sensitivity of the data, and/or other descriptive metadata. For example, internal data and/or personally identifying information (PII) may be flagged as sensitive data subject to access restrictions by metadata corresponding to the variable containing the internal data and/or PII. Metadata may be copied from the data storage formats 301 or generated separately for virtualized database structure 320.

In various embodiments, virtualized database structure 320 may provide a single, unified, and virtualized data storage format that catalogues accessible variables and provides a single access point for records stored on data storage formats 301. Client 322 (which may operate using similar hardware and software to client 210 of FIG. 2) may access data stored in various data storage formats 301 via the virtualized database structure 320. In that regard, virtualized database structure 320 may be a single access point for data stored across the various data storage formats 301 on DFS 302.

In various embodiments, virtualized database structure 320 may store and maintain the catalog of variables including locations and descriptive metadata, but virtualized database structure 320 may not store the actual data contained in each variable. The data that populates the variables may be stored on DFS 302 using data storage formats 301. Virtualized database structure 320 may enable read and write access to the data stored in data storage formats 301 without a client system having knowledge of the underlying data storage formats 301.

For more information on big data management systems, see U.S. Ser. No. 14/944,902 titled INTEGRATED BIG DATA INTERFACE FOR MULTIPLE STORAGE TYPES and filed on Nov. 18, 2015; U.S. Ser. No. 14/944,979 titled SYSTEM AND METHOD FOR READING AND WRITING TO BIG DATA STORAGE FORMATS and filed on Nov. 18, 2015; U.S. Ser. No. 14/945,032 titled SYSTEM AND METHOD FOR CREATING, TRACKING, AND MAINTAINING BIG DATA USE CASES and filed on Nov. 18, 2015; U.S. Ser. No. 14/944,849 titled SYSTEM AND METHOD FOR AUTOMATICALLY CAPTURING AND RECORDING LINEAGE DATA FOR BIG DATA RECORDS and filed on Nov. 18, 2015; U.S. Ser. No. 14/944,898 titled SYSTEMS AND METHODS FOR TRACKING SENSITIVE DATA IN A BIG DATA ENVIRONMENT and filed on Nov. 18, 2015; and U.S. Ser. No. 14/944,961 titled SYSTEM AND METHOD TRANSFORMING SOURCE DATA INTO OUTPUT DATA IN BIG DATA ENVIRONMENTS and filed on Nov. 18, 2015, the contents of each of which are herein incorporated by reference in their entirety.

Figure 4:
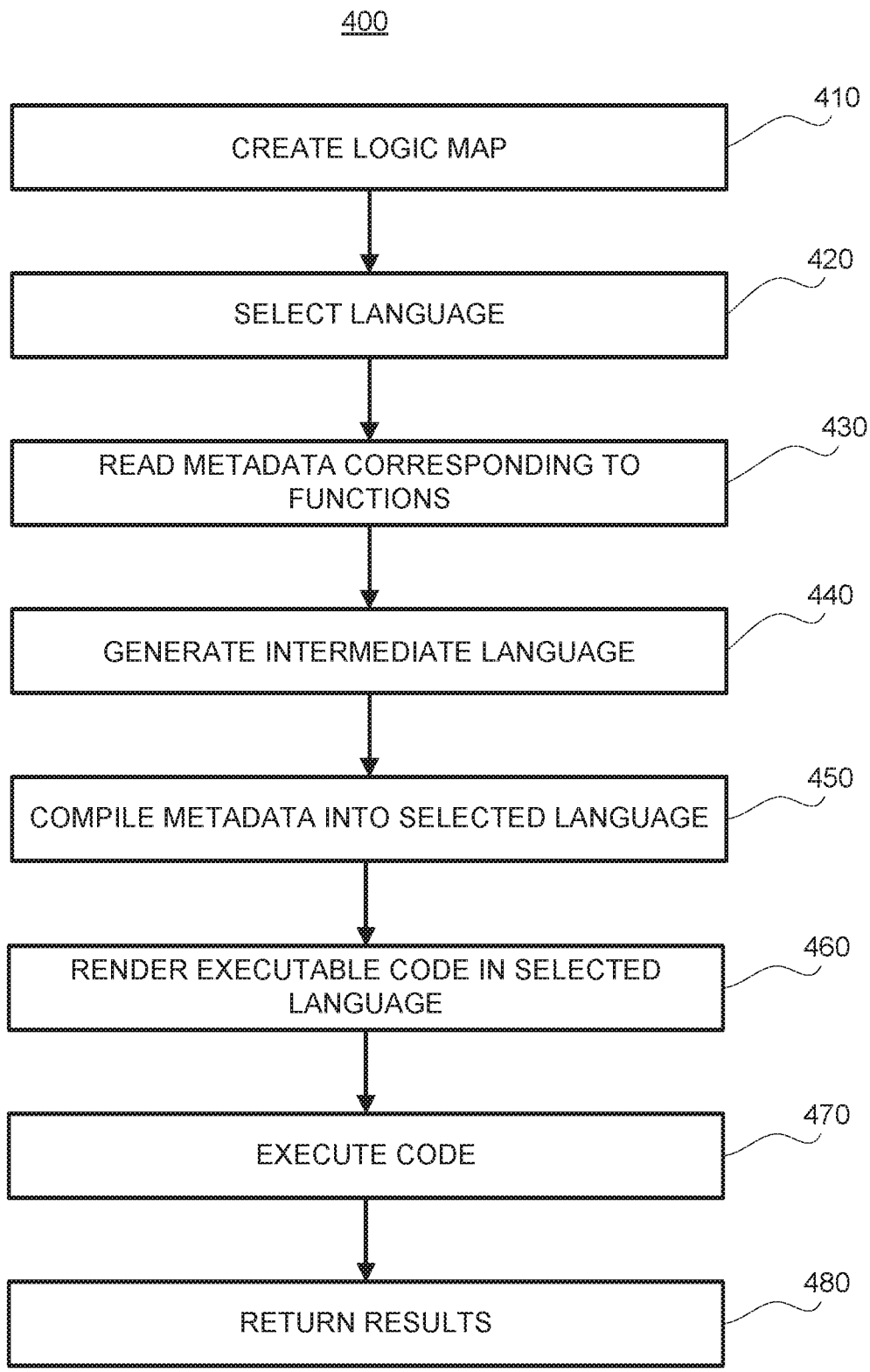
FIG. 4 illustrates a flowchart of a process for executing a logic map, in accordance with various embodiments.

Referring to FIG. 4, a flowchart 400 of a process for executing a logic map is illustrated, according to various embodiments. A user may create a logic map comprising one or more functions to be executed on data stored within the data management system (step 410). An authoring tool may select a language in which to execute the logic map based upon the format of the data stored within the data management system (step 420). In various embodiments, the language may comprise Teradata, Sybase. Hive, or COBOL. The authoring tool may read metadata corresponding to the functions in the logic map from a metadata store (step 430). The authoring tool may generate an intermediate language (step 440). The authoring tool may compile the metadata from the intermediate language to the selected language (step 450). The authoring tool may render executable code in the selected language from the intermediate language (step 460). The authoring tool may submit the executable code to the data management system. The data management system may execute the code on the data stored within the data management system (step 470). The data management system may return the results of execution of the logic map (step 480). The user may use the results in a business decisioning process, such as to identify a targeted group of consumers.

Figure 5:
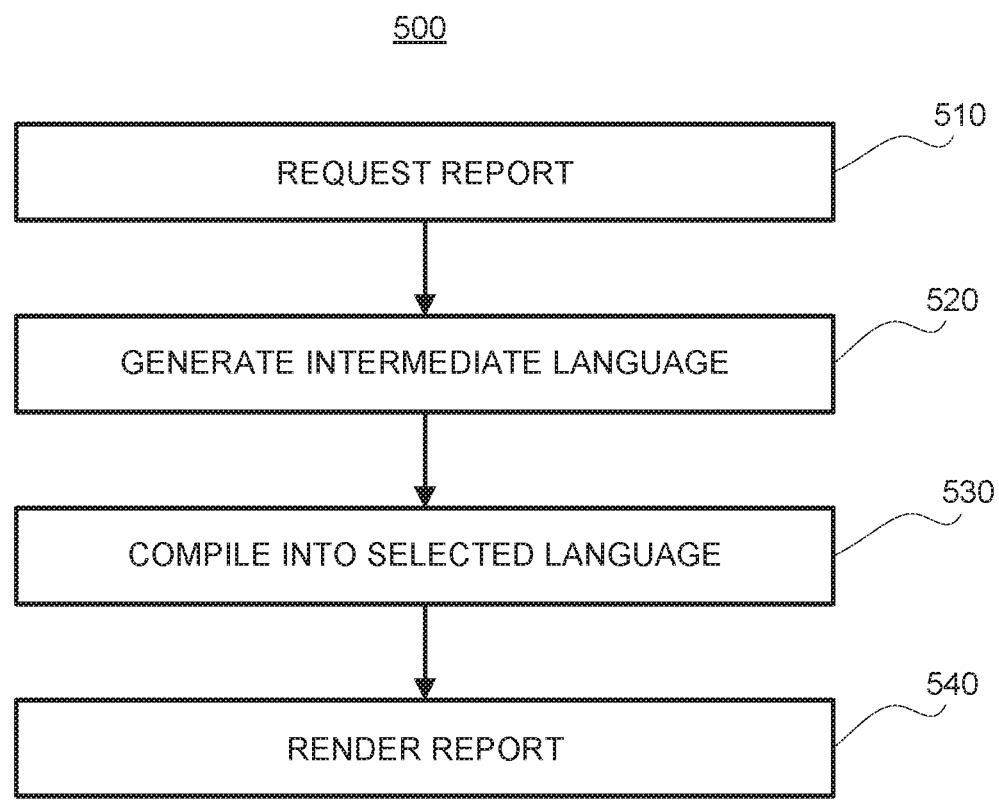
FIG. 5 illustrates a flowchart of a process for generating a report, in accordance with various embodiments.

Referring to FIG. 5, a flowchart 500 of a process for generating reports is illustrated, according to various embodiments. A user may request a report for a logic map (step 510). The user may select a report type to generate. For example, the report may be a requirements report, a lineage report, or a dependency report. The authoring tool may read the metadata store for logic metadata. The authoring tool may generate an intermediate language from the logic metadata (step 520). The authoring tool may compile the intermediate language to a selected language (step 530). The authoring tool may perform a dependency analysis and topographic sort. The authoring tool may render the report and save the report in a file, such as a PDF (step 540). The report may comprise documentation regarding the functions in the logic map, as well as any modifications which were made to the logic map, including when and by whom the modifications were made.

Systems, methods and computer program products are provided. In the detailed description herein, references to "various embodiments", "one embodiment", "an embodiment", "an example embodiment", and/or the like, indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

As used herein, "satisfy", "meet", "match", "associated with" or similar phrases may include an identical match, a partial match, meeting certain criteria, matching a subset of data, a correlation, satisfying certain criteria, a correspondence, an association, an algorithmic relationship and/or the like. Similarly, as used herein, "authenticate" or similar terms may include an exact authentication, a partial authentication, authenticating a subset of data, a correspondence, satisfying certain criteria, an association, an algorithmic relationship and/or the like.

The customer may be identified as a customer of interest to a merchant based on the customer's transaction history at the merchant, types of transactions, type of transaction account, frequency of transactions, number of transactions, lack of transactions, timing of transactions, transaction history at other merchants, demographic information, personal information (e.g., gender, race, religion), social media or any other online information, potential for transacting with the merchant and/or any other factors.

The phrases consumer, customer, user, account holder, account affiliate, cardmember or the like shall include any person, entity, business, government organization, business, software, hardware, machine associated with a transaction account, buys merchant offerings offered by one or more merchants using the account and/or who is legally designated for performing transactions on the account, regardless of whether a physical card is associated with the account. For example, the cardmember may include a transaction account owner, a transaction account user, an account affiliate, a child account user, a subsidiary account user, a beneficiary of an account, a custodian of an account, and/or any other person or entity affiliated or associated with a transaction account.

As used herein, big data may refer to partially or fully structured, semi-structured, or unstructured data sets including millions of rows and hundreds of thousands of columns. A big data set may be compiled, for example, from a history of purchase transactions over time, from web registrations, from social media, from records of charge (ROC), from summaries of charges (SOC), from internal data, or from other suitable sources. Big data sets may be compiled without descriptive metadata such as column types, counts, percentiles, or other interpretive-aid data points.

A record of charge (or "ROC") may comprise any transaction or transaction data. The ROC may be a unique identifier associated with a transaction. A transaction may, in various embodiments, be performed by a one or more members using a transaction account, such as a transaction account associated with a gift card, a debit card, a credit card, and the like. A ROC may, in addition, contain details such as location, merchant name or identifier, transaction amount, transaction date, account number, account security pin or code, account expiry date, and the like for the transaction.

Any communication, transmission and/or channel discussed herein may include any system or method for delivering content (e.g. data, information, metadata, and/or the like.), and/or the content itself. The content may be presented in any form or medium, and in various embodiments, the content may be delivered electronically and/or capable of being presented electronically. For example, a channel may comprise a website or device (e.g., Facebook, YOUTUBE®, APPLE®TV®, PANDORA®, XBOX®, SONY® PLAYSTATION®), a uniform resource locator ("URL"), a document (e.g., a MICROSOFT® Word® document, a MICROSOFT® Excel® document, an ADOBE® .pdf document, and/or the like.), an "ebook," an "emagazine," an application or microapplication (as described herein), an SMS or other type of text message, an email, Facebook, twitter, MMS and/or other type of communication technology. In various embodiments, a channel may be hosted or provided by a data partner. In various embodiments, the distribution channel may comprise at least one of a merchant website, a social media website, affiliate or partner websites, an external vendor, a mobile device communication, social media network and/or location based service. Distribution channels may include at least one of a merchant website, a social media site, affiliate or partner websites, an external vendor, and a mobile device communication. Examples of social media sites include FACEBOOK®, FOURSQUARE®, TWITTER®, MYSPACE®, LINKEDIN®, and the like. Examples of affiliate or partner websites include AMERICAN EXPRESS®, GROUPON®, LIVINGSOCIAL®, and the like. Moreover, examples of mobile device communications include texting, email, and mobile applications for smartphones.

A "consumer profile" or "consumer profile data" may comprise any information or data about a consumer that describes an attribute associated with the consumer (e.g., a preference, an interest, demographic information, personally identifying information, and the like).

In various embodiments, the methods described herein are implemented using the various particular machines described herein. The methods described herein may be implemented using the below particular machines, and those hereinafter developed, in any suitable combination, as would be appreciated immediately by one skilled in the art. Further, as is unambiguous from this disclosure, the methods described herein may result in various transformations of certain articles.

For the sake of brevity, conventional data networking, application development and other functional aspects of the systems (and components of the individual operating components of the systems) may not be described in detail herein. Furthermore, the connecting lines shown in the various figures contained herein are intended to represent exemplary functional relationships and/or physical couplings between the various elements. It should be noted that many alternative or additional functional relationships or physical connections may be present in a practical system.

The various system components discussed herein may include one or more of the following: a host server or other computing systems including a processor for processing digital data; a memory coupled to the processor for storing digital data; an input digitizer coupled to the processor for inputting digital data; an application program stored in the memory and accessible by the processor for directing processing of digital data by the processor; a display device coupled to the processor and memory for displaying information derived from digital data processed by the processor, and a plurality of databases. Various databases used herein may include: client data; merchant data; financial institution data; and/or like data useful in the operation of the system. As those skilled in the art will appreciate, user computer may include an operating system (e.g., WINDOWS® NT®, WINDOWS® 95/98/2000®, WINDOWS® XP®, WINDOWS® Vista®, WINDOWS® 7®, OS2, UNIX®, LINUX®, SOLARIS®, MacOS, and/or the like.) as well as various conventional support software and drivers typically associated with computers.

The present system or any part(s) or function(s) thereof may be implemented using hardware, software or a combination thereof and may be implemented in one or more computer systems or other processing systems. However, the manipulations performed by embodiments were often referred to in terms, such as matching or selecting, which are commonly associated with mental operations performed by a human operator. No such capability of a human operator is necessary, or desirable in most cases, in any of the operations described herein. Rather, the operations may be machine operations. Useful machines for performing the various embodiments include general purpose digital computers or similar devices.

In fact, in various embodiments, the embodiments are directed toward one or more computer systems capable of carrying out the functionality described herein. The computer system includes one or more processors, such as processor. The processor is connected to a communication infrastructure (e.g., a communications bus, cross-over bar, or network). Various software embodiments are described in terms of this exemplary computer system. After reading this description, it will become apparent to a person skilled in the relevant art(s) how to implement various embodiments using other computer systems and/or architectures. Computer system can include a display interface that forwards graphics, text, and other data from the communication infrastructure (or from a frame buffer not shown) for display on a display unit.

Computer system also includes a main memory, such as for example random access memory (RAM), and may also include a secondary memory. The secondary memory may include, for example, a hard disk drive and/or a removable storage drive, representing a floppy disk drive, a magnetic tape drive, an optical disk drive, and/or the like. The removable storage drive reads from and/or writes to a removable storage unit in a well-known manner. Removable storage unit represents a floppy disk, magnetic tape, optical disk, and/or the like, which is read by and written to by removable storage drive. As will be appreciated, the removable storage unit includes a computer usable storage medium having stored therein computer software and/or data.

In various embodiments, secondary memory may include other similar devices for allowing computer programs or other instructions to be loaded into computer system. Such devices may include, for example, a removable storage unit and an interface. Examples of such may include a program cartridge and cartridge interface (such as that found in video game devices), a removable memory chip (such as an erasable programmable read only memory (EPROM), or programmable read only memory (PROM)) and associated socket, and other removable storage units and interfaces, which allow software and data to be transferred from the removable storage unit to computer system.

Computer system may also include a communications interface. Communications interface allows software and data to be transferred between computer system and external devices. Examples of communications interface may include a modem, a network interface (such as an Ethernet card), a communications port, a Personal Computer Memory Card International Association (PCMCIA) slot and card, and/or the like. Software and data transferred via communications interface are in the form of signals which may be electronic, electromagnetic, optical or other signals capable of being received by communications interface. These signals are provided to communications interface via a communications path (e.g., channel). This channel carries signals and may be implemented using wire, cable, fiber optics, a telephone line, a cellular link, a radio frequency (RF) link, wireless and other communications channels.

The terms "computer program medium" and "computer usable medium" and "computer readable medium" are used to generally refer to media such as removable storage drive and a hard disk installed in hard disk drive. These computer program products provide software to computer system.

Computer programs (also referred to as computer control logic) are stored in main memory and/or secondary memory. Computer programs may also be received via communications interface. Such computer programs, when executed, enable the computer system to perform the features as discussed herein. In particular, the computer programs, when executed, enable the processor to perform the features of various embodiments. Accordingly, such computer programs represent controllers of the computer system.

In various embodiments, software may be stored in a computer program product and loaded into computer system using removable storage drive, hard disk drive or communications interface. The control logic (software), when executed by the processor, causes the processor to perform the functions of various embodiments as described herein. In various embodiments, hardware components such as application specific integrated circuits (ASICs). Implementation of the hardware state machine so as to perform the functions described herein will be apparent to persons skilled in the relevant art(s).

In various embodiments, the server may include application servers (e.g. WEB SPHERE, WEB LOGIC, JBOSS). In various embodiments, the server may include web servers (e.g. APACHE, IIS, GWS, SUN JAVA, SYSTEM WEB SERVER).

A web client includes any device (e.g., personal computer) which communicates via any network, for example such as those discussed herein. Such browser applications comprise Internet browsing software installed within a computing unit or a system to conduct online transactions and/or communications. These computing units or systems may take the form of a computer or set of computers, although other types of computing units or systems may be used, including laptops, notebooks, tablets, hand held computers, personal digital assistants, set-top boxes, workstations, computer-servers, main frame computers, mini-computers, PC servers, pervasive computers, network sets of computers, personal computers, such as IPADS®, IMACS®, and MACBOOKS®, kiosks, terminals, point of sale (POS) devices and/or terminals, televisions, or any other device capable of receiving data over a network. A web-client may run MICROSOFT® INTERNET EXPLORER®, MOZILLA® FIREFOX®, GOOGLE® CHROME®, APPLE® Safari, or any other of the myriad software packages available for browsing the internet.

Practitioners will appreciate that a web client may or may not be in direct contact with an application server. For example, a web client may access the services of an application server through another server and/or hardware component, which may have a direct or indirect connection to an Internet server. For example, a web client may communicate with an application server via a load balancer. In various embodiments, access is through a network or the Internet through a commercially-available web-browser software package.

As those skilled in the art will appreciate, a web client includes an operating system (e.g., WINDOWS® NT®, 95/98/2000/CE/Mobile, OS2, UNIX®, LINUX®, SOLARIS®, MacOS, and/or the like.) as well as various conventional support software and drivers typically associated with computers. A web client may include any suitable personal computer, network computer, workstation, personal digital assistant, cellular phone, smart phone, minicomputer, mainframe or the like. A web client can be in a home or business environment with access to a network. In various embodiments, access is through a network or the Internet through a commercially available web-browser software package. A web client may implement security protocols such as Secure Sockets Layer (SSL) and Transport Layer Security (TLS). A web client may implement several application layer protocols including http, https, ftp, and sftp.

In various embodiments, components, modules, and/or engines of system 100 may be implemented as micro-applications or micro-apps. Micro-apps are typically deployed in the context of a mobile operating system, including for example, a WINDOWS® mobile operating system, an ANDROID® Operating System, APPLE® IOS®, a BLACKBERRY® operating system and the like. The micro-app may be configured to leverage the resources of the larger operating system and associated hardware via a set of predetermined rules which govern the operations of various operating systems and hardware resources. For example, where a micro-app desires to communicate with a device or network other than the mobile device or mobile operating system, the micro-app may leverage the communication protocol of the operating system and associated device hardware under the predetermined rules of the mobile operating system. Moreover, where the micro-app desires an input from a user, the micro-app may be configured to request a response from the operating system which monitors various hardware components and then communicates a detected input from the hardware to the micro-app.

As used herein, the term "network" includes any cloud, cloud computing system or electronic communications system or method which incorporates hardware and/or software components. Communication among the parties may be accomplished through any suitable communication channels, such as, for example, a telephone network, an extranet, an intranet, Internet, point of interaction device (point of sale device, personal digital assistant (e.g., IPHONE®, BLACKBERRY®), cellular phone, kiosk, and/or the like.), online communications, satellite communications, off-line communications, wireless communications, transponder communications, local area network (LAN), wide area network (WAN), virtual private network (VPN), networked or linked devices, keyboard, mouse and/or any suitable communication or data input modality. Moreover, although the system is frequently described herein as being implemented with TCP/IP communications protocols, the system may also be implemented using IPX, APPLE®talk, IP-6, NetBIOS®, OSI, any tunneling protocol (e.g. IPsec, SSH), or any number of existing or future protocols. If the network is in the nature of a public network, such as the Internet, it may be advantageous to presume the network to be insecure and open to eavesdroppers. Specific information related to the protocols, standards, and application software utilized in connection with the Internet is generally known to those skilled in the art and, as such, need not be detailed herein. See, for example, Dilip Naik, Internet Standards and Protocols (1998); JAVA® 2 Complete, various authors, (Sybex 1999); Deborah Ray and Eric Ray, Mastering HTML 4.0 (1997); and Loshin, TCP/IP Clearly Explained (1997) and David Gourley and Brian Totty, HTTP, The Definitive Guide (2002), the contents of which are hereby incorporated by reference.

The various system components may be independently, separately or collectively suitably coupled to the network via data links which includes, for example, a connection to an Internet Service Provider (ISP) over the local loop as is typically used in connection with standard modem communication, cable modem, Dish Networks®, ISDN, Digital Subscriber Line (DSL), or various wireless communication methods, see, e.g., Gilbert Held. Understanding Data Communications (1996), which is hereby incorporated by reference. It is noted that the network may be implemented as other types of networks, such as an interactive television (ITV) network. Moreover, the system contemplates the use, sale or distribution of any goods, services or information over any network having similar functionality described herein.

"Cloud" or "Cloud computing" includes a model for enabling convenient, on-demand network access to a shared pool of configurable computing resources (e.g., networks, servers, storage, applications, and services) that can be rapidly provisioned and released with minimal management effort or service provider interaction. Cloud computing may include location-independent computing, whereby shared servers provide resources, software, and data to computers and other devices on demand. For more information regarding cloud computing, see the NIST's (National Institute of Standards and Technology) definition of cloud computing at http://csrc.nist.gov/publications/nistpubs/800-145/SP800-145.pdf (last visited June 2012), which is hereby incorporated by reference in its entirety.

As used herein, "transmit" may include sending electronic data from one system component to another over a network connection. Additionally, as used herein, "data" may include encompassing information such as commands, queries, files, data for storage, and the like in digital or any other form.

Phrases and terms similar to an "item" may include any good, service, information, experience, entertainment, data, offer, discount, rebate, points, virtual currency, content, access, rental, lease, contribution, account, credit, debit, benefit, right, reward, points, coupons, credits, monetary equivalent, anything of value, something of minimal or no value, monetary value, non-monetary value and/or the like. Moreover, the "transactions" or "purchases" discussed herein may be associated with an item. Furthermore, a "reward" may be an item.

The system contemplates uses in association with web services, utility computing, pervasive and individualized computing, security and identity solutions, autonomic computing, cloud computing, commodity computing, mobility and wireless solutions, open source, biometrics, grid computing and/or mesh computing.

Any databases discussed herein may include relational, hierarchical, graphical, or object-oriented structure and/or any other database configurations. Common database products that may be used to implement the databases include DB2 by IBM® (Armonk, N.Y.), various database products available from ORACLE® Corporation (Redwood Shores, Calif.). MICROSOFT® Access® or MICROSOFT® SQL Server® by MICROSOFT® Corporation (Redmond, Wash.), My SQL by My SQL AB (Uppsala, Sweden), or any other suitable database product. Moreover, the databases may be organized in any suitable manner, for example, as data tables or lookup tables. Each record may be a single file, a series of files, a linked series of data fields or any other data structure. Association of certain data may be accomplished through any desired data association technique such as those known or practiced in the art. For example, the association may be accomplished either manually or automatically. Automatic association techniques may include, for example, a database search, a database merge, GREP, AGREP, SQL, using a key field in the tables to speed searches, sequential searches through all the tables and files, sorting records in the file according to a known order to simplify lookup, and/or the like. The association step may be accomplished by a database merge function, for example, using a "key field" in pre-selected databases or data sectors. Various database tuning steps are contemplated to optimize database performance. For example, frequently used files such as indexes may be placed on separate file systems to reduce In/Out ("I/O") bottlenecks.

More particularly, a "key field" partitions the database according to the high-level class of objects defined by the key field. For example, certain types of data may be designated as a key field in a plurality of related data tables and the data tables may then be linked on the basis of the type of data in the key field. The data corresponding to the key field in each of the linked data tables is preferably the same or of the same type. However, data tables having similar, though not identical, data in the key fields may also be linked by using AGREP, for example. In accordance with one embodiment, any suitable data storage technique may be utilized to store data without a standard format. Data sets may be stored using any suitable technique, including, for example, storing individual files using an ISO/IEC 7816-4 file structure; implementing a domain whereby a dedicated file is selected that exposes one or more elementary files containing one or more data sets; using data sets stored in individual files using a hierarchical filing system; data sets stored as records in a single file (including compression, SQL accessible, hashed via one or more keys, numeric, alphabetical by first tuple, and/or the like.); Binary Large Object (BLOB); stored as ungrouped data elements encoded using ISO/IEC 7816-6 data elements; stored as ungrouped data elements encoded using ISO/IEC Abstract Syntax Notation (ASN.1) as in ISO/IEC 8824 and 8825; and/or other proprietary techniques that may include fractal compression methods, image compression methods, and/or the like.

In various embodiments, the ability to store a wide variety of information in different formats is facilitated by storing the information as a BLOB. Thus, any binary information can be stored in a storage space associated with a data set. As discussed above, the binary information may be stored on the financial transaction instrument or external to but affiliated with the financial transaction instrument. The BLOB method may store data sets as ungrouped data elements formatted as a block of binary via a fixed memory offset using either fixed storage allocation, circular queue techniques, or best practices with respect to memory management (e.g., paged memory, least recently used, and/or the like.). By using BLOB methods, the ability to store various data sets that have different formats facilitates the storage of data associated with the financial transaction instrument by multiple and unrelated owners of the data sets. For example, a first data set which may be stored may be provided by a first party, a second data set which may be stored may be provided by an unrelated second party, and yet a third data set which may be stored, may be provided by an third party unrelated to the first and second party. Each of these three exemplary data sets may contain different information that is stored using different data storage formats and/or techniques. Further, each data set may contain subsets of data that also may be distinct from other subsets.

As stated above, in various embodiments, the data can be stored without regard to a common format. However, the data set (e.g., BLOB) may be annotated in a standard manner when provided for manipulating the data onto the financial transaction instrument. The annotation may comprise a short header, trailer, or other appropriate indicator related to each data set that is configured to convey information useful in managing the various data sets. For example, the annotation may be called a "condition header", "header", "trailer", or "status", herein, and may comprise an indication of the status of the data set or may include an identifier correlated to a specific issuer or owner of the data. In one example, the first three bytes of each data set BLOB may be configured or configurable to indicate the status of that particular data set; e.g., LOADED, INITIALIZED, READY, BLOCKED, REMOVABLE, or DELETED. Subsequent bytes of data may be used to indicate for example, the identity of the issuer, user, transaction/membership account identifier or the like. Each of these condition annotations are further discussed herein.

The data set annotation may also be used for other types of status information as well as various other purposes. For example, the data set annotation may include security information establishing access levels. The access levels may, for example, be configured to permit only certain individuals, levels of employees, companies, or other entities to access data sets, or to permit access to specific data sets based on the transaction, merchant, issuer, user or the like. Furthermore, the security information may restrict/permit only certain actions such as accessing, modifying, and/or deleting data sets. In one example, the data set annotation indicates that only the data set owner or the user are permitted to delete a data set, various identified users may be permitted to access the data set for reading, and others are altogether excluded from accessing the data set. However, other access restriction parameters may also be used allowing various entities to access a data set with various permission levels as appropriate.

The data, including the header or trailer may be received by a standalone interaction device configured to add, delete, modify, or augment the data in accordance with the header or trailer. As such, in one embodiment, the header or trailer is not stored on the transaction device along with the associated issuer-owned data but instead the appropriate action may be taken by providing to the transaction instrument user at the stand alone device, the appropriate option for the action to be taken. The system may contemplate a data storage arrangement wherein the header or trailer, or header or trailer history, of the data is stored on the transaction instrument in relation to the appropriate data.

One skilled in the art will also appreciate that, for security reasons, any databases, systems, devices, servers or other components of the system may consist of any combination thereof at a single location or at multiple locations, wherein each database or system includes any of various suitable security features, such as firewalls, access codes, encryption, decryption, compression, decompression, and/or the like.

The computing unit of the web client may be further equipped with an Internet browser connected to the Internet or an intranet using standard dial-up, cable, DSL or any other Internet protocol known in the art. Transactions originating at a web client may pass through a firewall in order to prevent unauthorized access from users of other networks. Further, additional firewalls may be deployed between the varying components of CMS to further enhance security.

Firewall may include any hardware and/or software suitably configured to protect CMS components and/or enterprise computing resources from users of other networks. Further, a firewall may be configured to limit or restrict access to various systems and components behind the firewall for web clients connecting through a web server. Firewall may reside in varying configurations including Stateful Inspection, Proxy based, access control lists, and Packet Filtering among others. Firewall may be integrated within an web server or any other CMS components or may further reside as a separate entity. A firewall may implement network address translation ("NAT") and/or network address port translation ("NAPT"). A firewall may accommodate various tunneling protocols to facilitate secure communications, such as those used in virtual private networking. A firewall may implement a demilitarized zone ("DMZ") to facilitate communications with a public network such as the Internet. A firewall may be integrated as software within an Internet server, any other application server components or may reside within another computing device or may take the form of a standalone hardware component.

The computers discussed herein may provide a suitable website or other Internet-based graphical user interface which is accessible by users. In one embodiment, the MICROSOFT® INTERNET INFORMATION SERVICES® (IIS), MICROSOFT® Transaction Server (MTS), and MICROSOFT® SQL Server, are used in conjunction with the MICROSOFT® operating system. MICROSOFT® NT web server software, a MICROSOFT® SQL Server database system, and a MICROSOFT® Commerce Server. Additionally, components such as Access or MICROSOFT® SQL Server, ORACLE®, Sybase, Informix MySQL, Interbase, and/or the like, may be used to provide an Active Data Object (ADO) compliant database management system. In one embodiment, the Apache web server is used in conjunction with a Linux operating system, a MySQL database, and the Perl, PHP, and/or Python programming languages.

Any of the communications, inputs, storage, databases or displays discussed herein may be facilitated through a website having web pages. The term "web page" as it is used herein is not meant to limit the type of documents and applications that might be used to interact with the user. For example, a typical website might include, in addition to standard HTML documents, various forms, JAVA® APPLE®ts, JAVASCRIPT, active server pages (ASP), common gateway interface scripts (CGI), extensible markup language (XML), dynamic HTML, cascading style sheets (CSS), AJAX (Asynchronous JAVASCRIPT And XML), helper applications, plug-ins, and the like. A server may include a web service that receives a request from a web server, the request including a URL and an IP address (123.56.789.234). The web server retrieves the appropriate web pages and sends the data or applications for the web pages to the IP address. Web services are applications that are capable of interacting with other applications over a communications means, such as the internet. Web services are typically based on standards or protocols such as XML, SOAP, AJAX, WSDL and UDDI. Web services methods are well known in the art, and are covered in many standard texts. See, e.g., Alex Nghiem, IT Web Services: A Roadmap for the Enterprise (2003), hereby incorporated by reference.

Middleware may include any hardware and/or software suitably configured to facilitate communications and/or process transactions between disparate computing systems. Middleware components are commercially available and known in the art. Middleware may be implemented through commercially available hardware and/or software, through custom hardware and/or software components, or through a combination thereof. Middleware may reside in a variety of configurations and may exist as a standalone system or may be a software component residing on the Internet server. Middleware may be configured to process transactions between the various components of an application server and any number of internal or external systems for any of the purposes disclosed herein. WEBSPHERE MQ™ (formerly MQSeries) by IBM®, Inc. (Armonk, N.Y.) is an example of a commercially available middleware product. An Enterprise Service Bus ("ESB") application is another example of middleware.

Practitioners will also appreciate that there are a number of methods for displaying data within a browser-based document. Data may be represented as standard text or within a fixed list, scrollable list, drop-down list, editable text field, fixed text field, pop-up window, and the like. Likewise, there are a number of methods available for modifying data in a web page such as, for example, free text entry using a keyboard, selection of menu items, check boxes, option boxes, and the like.

The system and method may be described herein in terms of functional block components, screen shots, optional selections and various processing steps. It should be appreciated that such functional blocks may be realized by any number of hardware and/or software components configured to perform the specified functions. For example, the system may employ various integrated circuit components, e.g., memory elements, processing elements, logic elements, look-up tables, and the like, which may carry out a variety of functions under the control of one or more microprocessors or other control devices. Similarly, the software elements of the system may be implemented with any programming or scripting language such as C, C++, C#, JAVA®, JAVASCRIPT, VBScript, Macromedia Cold Fusion, COBOL, MICROSOFT® Active Server Pages, assembly, PERL, PHP, awk, Python, Visual Basic. SQL Stored Procedures, PL/SQL, any UNIX shell script, and extensible markup language (XML) with the various algorithms being implemented with any combination of data structures, objects, processes, routines or other programming elements. Further, it should be noted that the system may employ any number of conventional techniques for data transmission, signaling, data processing, network control, and the like. Still further, the system could be used to detect or prevent security issues with a client-side scripting language, such as JAVASCRIPT, VBScript or the like. For a basic introduction of cryptography and network security, see any of the following references: (1) "Applied Cryptography: Protocols, Algorithms, And Source Code In C," by Bruce Schneier, published by John Wiley & Sons (second edition, 1995); (2) "JAVA® Cryptography" by Jonathan Knudson, published by O'Reilly & Associates (1998); (3) "Cryptography & Network Security: Principles & Practice" by William Stallings, published by Prentice Hall; all of which are hereby incorporated by reference.

As used herein, the term "end user", "consumer", "customer", "cardmember", "business" or "merchant" may be used interchangeably with each other, and each shall mean any person, entity, government organization, business, machine, hardware, and/or software. A bank may be part of the system, but the bank may represent other types of card issuing institutions, such as credit card companies, card sponsoring companies, or third party issuers under contract with financial institutions. It is further noted that other participants may be involved in some phases of the transaction, such as an intermediary settlement institution, but these participants are not shown.

Each participant is equipped with a computing device in order to interact with the system and facilitate online commerce transactions. The customer has a computing unit in the form of a personal computer, although other types of computing units may be used including laptops, notebooks, hand held computers, set-top boxes, cellular telephones, touch-tone telephones and the like. The merchant has a computing unit implemented in the form of a computer-server, although other implementations are contemplated by the system. The bank has a computing center shown as a main frame computer. However, the bank computing center may be implemented in other forms, such as a mini-computer, a PC server, a network of computers located in the same of different geographic locations, or the like. Moreover, the system contemplates the use, sale or distribution of any goods, services or information over any network having similar functionality described herein The merchant computer and the bank computer may be interconnected via a second network, referred to as a payment network. The payment network which may be part of certain transactions represents existing proprietary networks that presently accommodate transactions for credit cards, debit cards, and other types of financial-banking cards. The payment network is a closed network that is assumed to be secure from eavesdroppers. Exemplary transaction networks may include the American Express®, VisaNet® and the Veriphone® networks.

The electronic commerce system may be implemented at the customer and issuing bank. In an exemplary implementation, the electronic commerce system is implemented as computer software modules loaded onto the customer computer and the banking computing center. The merchant computer does not require any additional software to participate in the online commerce transactions supported by the online commerce system.

As will be appreciated by one of ordinary skill in the art, the system may be embodied as a customization of an existing system, an add-on product, a processing apparatus executing upgraded software, a standalone system, a distributed system, a method, a data processing system, a device for data processing, and/or a computer program product. Accordingly, any portion of the system or a module may take the form of a processing apparatus executing code, an internet based embodiment, an entirely hardware embodiment, or an embodiment combining aspects of the internet, software and hardware. Furthermore, the system may take the form of a computer program product on a computer-readable storage medium having computer-readable program code means embodied in the storage medium. Any suitable computer-readable storage medium may be utilized, including hard disks, CD-ROM, optical storage devices, magnetic storage devices, and/or the like.

The system and method is described herein with reference to screen shots, block diagrams and flowchart illustrations of methods, apparatus (e.g., systems), and computer program products according to various embodiments. It will be understood that each functional block of the block diagrams and the flowchart illustrations, and combinations of functional blocks in the block diagrams and flowchart illustrations, respectively, can be implemented by computer program instructions.

The process flows and screenshots depicted are merely embodiments and are not intended to limit the scope of the disclosure. For example, the steps recited in any of the method or process descriptions may be executed in any order and are not limited to the order presented. It will be appreciated that the following description makes appropriate references not only to the steps and user interface elements depicted, but also to the various system components as described above.

These computer program instructions may be loaded onto a general purpose computer, special purpose computer, or other programmable data processing apparatus to produce a machine, such that the instructions that execute on the computer or other programmable data processing apparatus create means for implementing the functions specified in the flowchart block or blocks. These computer program instructions may also be stored in a computer-readable memory that can direct a computer or other programmable data processing apparatus to function in a particular manner, such that the instructions stored in the computer-readable memory produce an article of manufacture including instruction means which implement the function specified in the flowchart block or blocks. The computer program instructions may also be loaded onto a computer or other programmable data processing apparatus to cause a series of operational steps to be performed on the computer or other programmable apparatus to produce a computer-implemented process such that the instructions which execute on the computer or other programmable apparatus provide steps for implementing the functions specified in the flowchart block or blocks.

Accordingly, functional blocks of the block diagrams and flowchart illustrations support combinations of means for performing the specified functions, combinations of steps for performing the specified functions, and program instruction means for performing the specified functions. It will also be understood that each functional block of the block diagrams and flowchart illustrations, and combinations of functional blocks in the block diagrams and flowchart illustrations, can be implemented by either special purpose hardware-based computer systems which perform the specified functions or steps, or suitable combinations of special purpose hardware and computer instructions. Further, illustrations of the process flows and the descriptions thereof may make reference to user WINDOWS®, webpages, websites, web forms, prompts, and/or the like. Practitioners will appreciate that the illustrated steps described herein may comprise in any number of configurations including the use of WINDOWS®, webpages, web forms, popup WINDOWS®, prompts and the like. It should be further appreciated that the multiple steps as illustrated and described may be combined into single webpages and/or WINDOWS® but have been expanded for the sake of simplicity. In other cases, steps illustrated and described as single process steps may be separated into multiple webpages and/or WINDOWS® but have been combined for simplicity.

The term "non-transitory" is to be understood to remove only propagating transitory signals per se from the claim scope and does not relinquish rights to all standard computer-readable media that are not only propagating transitory signals per se. Stated another way, the meaning of the term "non-transitory computer-readable medium" and "non-transitory computer-readable storage medium" should be construed to exclude only those types of transitory computer-readable media which were found in In Re Nuijten to fall outside the scope of patentable subject matter under 35 U.S.C. § 101.

Benefits, other advantages, and solutions to problems have been described herein with regard to specific embodiments. However, the benefits, advantages, solutions to problems, and any elements that may cause any benefit, advantage, or solution to occur or become more pronounced are not to be construed as critical, required, or essential features or elements of the disclosure. The scope of the disclosure is accordingly to be limited by nothing other than the appended claims, in which reference to an element in the singular is not intended to mean "one and only one" unless explicitly so stated, but rather "one or more." Moreover, where a phrase similar to 'at least one of A, B, and C' or 'at least one of A, B, or C' is used in the claims or specification, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C. Although the disclosure includes a method, it is contemplated that it may be embodied as computer program instructions on a tangible computer-readable carrier, such as a magnetic or optical memory or a magnetic or optical disk. All structural, chemical, and functional equivalents to the elements of the above-described various embodiments that are known to those of ordinary skill in the art are expressly incorporated herein by reference and are intended to be encompassed by the present claims. Moreover, it is not necessary for a device or method to address each and every problem sought to be solved by the present disclosure, for it to be encompassed by the present claims. Furthermore, no element, component, or method step in the present disclosure is intended to be dedicated to the public regardless of whether the element, component, or method step is explicitly recited in the claims. No claim element herein is to be construed under the provisions of 35 U.S.C. 112 (f) unless the element is expressly recited using the phrase "means for." As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

Phrases and terms similar to "account", "account number", "account code" or "consumer account" as used herein, may include any device, code (e.g., one or more of an authorization/access code, personal identification number ("PIN"), Internet code, other identification code, and/or the like), number, letter, symbol, digital certificate, smart chip, digital signal, analog signal, biometric or other identifier/indicia suitably configured to allow the consumer to access, interact with or communicate with the system. The account number may optionally be located on or associated with a rewards account, charge account, credit account, debit account, prepaid account, telephone card, embossed card, smart card, magnetic stripe card, bar code card, transponder, radio frequency card or an associated account.

Phrases and terms similar to "transaction account" may include any account that may be used to facilitate a financial transaction.

Phrases and terms similar to "financial institution" or "transaction account issuer" may include any entity that offers transaction account services. Although often referred to as a "financial institution," the financial institution may represent any type of bank, lender or other type of account issuing institution, such as credit card companies, card sponsoring companies, or third party issuers under contract with financial institutions. It is further noted that other participants may be involved in some phases of the transaction, such as an intermediary settlement institution.

Phrases and terms similar to "business" or "merchant" may be used interchangeably with each other and shall mean any person, entity, distributor system, software and/or hardware that is a provider, broker and/or any other entity in the distribution chain of goods or services. For example, a merchant may be a grocery store, a retail store, a travel agency, a service provider, an on-line merchant or the like.

Phrases and terms similar to "internal data" may include any data a credit issuer possesses or acquires pertaining to a particular consumer. Internal data may be gathered before, during, or after a relationship between the credit issuer and the transaction account holder (e.g., the consumer or buyer). Such data may include consumer demographic data. Consumer demographic data includes any data pertaining to a consumer. Consumer demographic data may include consumer name, address, telephone number, email address, employer and social security number. Consumer transactional data is any data pertaining to the particular transactions in which a consumer engages during any given time period. Consumer transactional data may include, for example, transaction amount, transaction time, transaction vendor/merchant, and transaction vendor/merchant location. Transaction vendor/merchant location may contain a high degree of specificity to a vendor/merchant. For example, transaction vendor/merchant location may include a particular gasoline filing station in a particular postal code located at a particular cross section or address. Also, for example, transaction vendor/merchant location may include a particular web address, such as a Uniform Resource Locator ("URL"), an email address and/or an Internet Protocol ("IP") address for a vendor/merchant. Transaction vendor/merchant, and transaction vendor/merchant location may be associated with a particular consumer and further associated with sets of consumers. Consumer payment data includes any data pertaining to a consumer's history of paying debt obligations. Consumer payment data may include consumer payment dates, payment amounts, balance amount, and credit limit. Internal data may further comprise records of consumer service calls, complaints, requests for credit line increases, questions, and comments. A record of a consumer service call includes, for example, date of call, reason for call, and any transcript or summary of the actual call.

Phrases similar to a "payment processor" may include a company (e.g., a third party) appointed (e.g., by a merchant) to handle transactions. A payment processor may include an issuer, acquirer, authorizer and/or any other system or entity involved in the transaction process. Payment processors may be broken down into two types: front-end and back-end. Front-end payment processors have connections to various transaction accounts and supply authorization and settlement services to the merchant banks' merchants. Back-end payment processors accept settlements from front-end payment processors and, via The Federal Reserve Bank, move money from an issuing bank to the merchant bank. In an operation that will usually take a few seconds, the payment processor will both check the details received by forwarding the details to the respective account's issuing bank or card association for verification, and may carry out a series of anti-fraud measures against the transaction. Additional parameters, including the account's country of issue and its previous payment history, may be used to gauge the probability of the transaction being approved. In response to the payment processor receiving confirmation that the transaction account details have been verified, the information may be relayed back to the merchant, who will then complete the payment transaction. In response to the verification being denied, the payment processor relays the information to the merchant, who may then decline the transaction. Phrases similar to a "payment gateway" or "gateway" may include an application service provider service that authorizes payments for e-businesses, online retailers, and/or traditional brick and mortar merchants. The gateway may be the equivalent of a physical point of sale terminal located in most retail outlets. A payment gateway may protect transaction account details by encrypting sensitive information, such as transaction account numbers, to ensure that information passes securely between the customer and the merchant and also between merchant and payment processor.

What is claimed is:

1. A method comprising:
   creating, by a computer-based system, a rollup variable;
   storing, by the computer-based system, the rollup variable in a common data table;
   providing, by the computer-based system, a plurality of available drag and drop items representing predefined functions;
   receiving, by the computer-based system, a first selection of a first drag and drop item from the plurality of drag and drop items, the first drag and drop item representing a first predefined function;
   receiving, by the computer-based system, a second selection of a second drag and drop item from the plurality of drag and drop items, the second drag and drop item representing a second predefined function, wherein the second predefined function is different than the first predefined function;
   requesting, by the computer-based system, an input identifying fields on which to execute the first predefined function and the second predefined function;
   creating, by the computer-based system, a logic map comprising the first predefined function and the second predefined function;
   selecting, by the computer-based system, a language in which to execute the logic map;
   reading, by the computer-based system, metadata in a metadata store corresponding to the first predefined function and the second predefined function;
   generating, by the computer-based system, an intermediate language;
   compiling, by the computer-based system, the metadata from the intermediate language to code in the selected language; and
   executing, by the computer-based system and based on the identified fields including the rollup variable, the code on the rollup variable in a data management system including the common data table.

2. The method of claim 1, wherein the selected language comprises at least one of Hive, or COBOL.

3. The method of claim 1, wherein the first predefined function comprises a windowing function, and wherein the second predefined function comprises a ranking function.

4. The method of claim 1, wherein the logic map comprises a visual representation of a plurality of functions.

5. The method of claim 1, wherein the code is executed on a plurality of rollup variables including the rollup variable.

6. The method of claim 5, further comprising storing, by the computer-based system, the plurality of rollup variables in the common data table.

7. The method of claim 1, wherein the data management system comprises a distributed file system.

8. An article of manufacture including a non-transitory, tangible computer readable storage medium having instructions stored thereon that, in response to execution by a computer-based system, cause the computer-based system to perform operations comprising:

creating, by the computer-based system, a rollup variable;

storing, by the computer-based system, the rollup variable in a common data table;

providing, by the computer-based system, a plurality of available drag and drop items representing predefined functions;

receiving, by the computer-based system, a first selection of a first drag and drop item from the plurality of drag and drop items, the first drag and drop item representing a first predefined function;

receiving, by the computer-based system, a second selection of a second drag and drop item from the plurality of drag and drop items, the second drag and drop item representing a second predefined function, wherein the second predefined function is different than the first predefined function;

requesting, by the computer-based system, an input identifying fields on which to execute the first predefined function and the second predefined function;

creating, by the computer-based system, a logic map comprising the first predefined function and the second predefined function;

selecting, by the computer-based system, a language in which to execute the logic map;

reading, by the computer-based system, metadata in a metadata store corresponding to the first predefined function and the second predefined function;

generating, by the computer-based system, an intermediate language;

compiling, by the computer-based system, the metadata from the intermediate language to code in the selected language; and executing, by the computer-based system and based on the identified fields including the rollup variable, the code on the rollup variable in a data management system including the common data table.

9. The article of manufacture of claim 8, wherein the selected language comprises at least one of Hive, or COBOL.

10. The article of manufacture of claim 8, wherein the first predefined function comprises a windowing function, and wherein the second predefined function comprises a ranking function.

11. The article of manufacture of claim 8, wherein the logic map comprises a visual representation of a plurality of functions.

12. The article of manufacture of claim 8, wherein the code is executed on a plurality of rollup variables including the rollup variable.

13. The article of manufacture of claim 12, the operations further comprising storing, by the computer-based system, the plurality of rollup variables in the common data table.

14. The article of manufacture of claim 8, wherein the data management system comprises a distributed file system.

15. A system comprising:

a processor, and a tangible, non-transitory memory configured to communicate with the processor, the tangible, non-transitory memory having instructions stored thereon that, in response to execution by the processor, cause the processor to perform operations comprising:

creating, by the processor, a rollup variable;

storing, by the processor, the rollup variable in a common data table;

providing, by the processor, a plurality of available drag and drop items representing predefined functions;

receiving, by the processor, a first selection of a first drag and drop item from the plurality of drag and drop items, the first drag and drop item representing a first predefined function;

receiving, by the processor, a second selection of a second drag and drop item from the plurality of drag and drop items, the second drag and drop item representing a second predefined function, wherein the second predefined function is different than the first predefined function;

requesting, by the processor, an input identifying fields on which to execute the first predefined function and the second predefined function;

creating, by the processor, a logic map comprising the first predefined function and the second predefined function;

selecting, by the processor, a language in which to execute the logic map;

reading, by the processor, metadata in a metadata store corresponding to the first predefined function and the second predefined function;

generating, by the processor, an intermediate language;

compiling, by the processor, the metadata from the intermediate language to code in the selected language; and executing, by the processor and based on the identified fields including the rollup variable, the code on the rollup variable in a data management system including the common data table.

16. The system of claim 15, wherein the selected language comprises at least one of Hive, or COBOL.

17. The system of claim 15, wherein the first predefined function comprises a windowing function, and wherein the second predefined function comprises a ranking function.

18. The system of claim 15, wherein the logic map comprises a visual representation of a plurality of functions.

19. The system of claim 15, wherein the code is executed on a plurality of rollup variables including the rollup variable.

20. The system of claim 19, the operations further comprising storing, by the processor, the plurality of rollup variables in the common data table.

* * * * *